Nov. 19, 1963  G. STAVIS  3,111,667
FREQUENCY MODULATED ALTIMETER
Filed June 28, 1960  4 Sheets-Sheet 1

INVENTOR.
GUS STAVIS
BY H.S. Mackey
ATTORNEY.

United States Patent Office 3,111,667
Patented Nov. 19, 1963

3,111,667
FREQUENCY MODULATED ALTIMETER
Gus Stavis, Briarcliff Manor, N.Y., assignor to General Precision, Inc., a corporation of Delaware
Filed June 28, 1960, Ser. No. 39,360
10 Claims. (Cl. 343—14)

This invention relates to devices propagating periodic wave motion in a beam toward a target and receiving an echo therefrom and more particularly to absolute altimeters which radiate frequency modulated energy and receive the echo thereof.

Frequency modulation of a carrier produces a number of frequency sidebands separated by frequency differences equal to the modulation frequency, and ranged above and below the carrier frequency. When a frequency modulated carrier is employed in the form of a beam of energy, for example a microwave beam, directed toward the earth from an aircraft, and the echo returned from the earth is received on the aircraft, this echo contains information which amongst other things gives the length of the beam, that is, the distance between the aircraft and the earth measured along the beam. When the beam is vertical, the distance is the aircraft altitude.

The frequency-modulated beam echo has a number of properties or characteristics, several of which are dependent on beam length and therefore can be employed to secure altitude information. One such property is the instantaneous frequency of the returned signal relative to that of the transmitter. This property has generally been the one employed in radio altimeters. However, it involves accurate measurement of a frequency which depends upon a number of things in addition to beam length, for example, frequency shift due to the Doppler effect. Accurate derivation of altitude employing this principle has therefore been found to be difficult.

This invention employs another property of the echo, namely the phase of a particular sideband of the FM echo from the ground. It has been found most desirable to employ, not the carrier or zeroeth order sideband of the signal frequency spectrum, but the first order sideband which lies at a frequency removed from the carrier frequency by the amount of the modulation frequency. It has also been found necessary for accuracy after isolating the sideband spectrum signal, to double its frequency before measuring phase. Since this invention employs phase measurement rather than frequency measurement, measurement accuracy is completely unaffected by any Doppler shifts which may be in the input signal frequency.

In carrying out this invention, the beam of energy may be electromagnetic energy of any frequency including optical frequencies, may consist of sound waves in air, sound waves in water for depth sounding, or may be of any other kind. The beam may have any direction and the target need not be the surface of the earth but can be the surface of any body or object which can reflect the beam energy. Furthermore, the propagating medium may be any which can support the propagating wave. For instance, sound waves may be used to locate foreign objects in the human body using this principle.

As an example of use of the principle in an altimeter, a narrow beam of frequency modulated microwave energy is directed vertically from an aircraft toward the earth. The beam need not be vertical, however, so long as it has a component directed toward the earth. The earth echo is received on the aircraft and the received signal is demodulated to a zero-beat-frequency signal by heterodyning it with the transmitter signal. This results in a heterodyne product carrier theoretically at zero frequency, and a series of sidebands centered at multiples of the modulating frequency. Each sideband actually consists of two fairly broad spectra equally spaced above and below each multiple frequency, due to Doppler and other effects, with little or no signal at any of the multiple points. The first sideband pair, centered at a frequency equal to the modulation frequency, is selected and isolated by a filter. This sideband pair is then frequency doubled, resulting in a double frequency sideband pair together with a sharp, single-frequency signal at exactly twice the modulation frequency. This single-frequency signal is now segregated by filtering, its phase is compared with that of a reference phase secured from the transmitter, and the phase difference is obtained. The aircraft altitude is directly proportional to this phase difference.

The altitude-measuring principle employed by this invention has the obvious limitation that at altitudes greater than one-half wavelength of the modulation frequency the altitude information is ambiguous. It therefore is necessary, if an unambiguous indication of an altitude, $h$, is to be secured, to employ a modulation frequency, $p$, which is less than the speed of light, $c$, divided by twice the altitude or $$p < \frac{c}{2h} \qquad (1)$$

Thus, decrease of the modulation frequency increases the maximum useful altitude of the altimeter. However, a lower limit to the modulation frequency is set by the necessity, after demodulation, of keeping the zeroeth order Doppler sideband spectrum separated from the first order lower Doppler sideband. The Doppler sideband frequency spectrum is dependent on many factors, so that the lower limit for the modulation frequency is different in different cases, but as an average example the lower limit for the modulation frequency might be set at 50 kc. p.s. The use of this frequency limits the maximum altitude at which this altimeter, as so far described, can be used to less than 10,000 feet.

This limitation can be overcome, however, by using instead of a single modulation frequency, two slightly separated modulation frequencies. The phase of the signal related to the frequency difference between them is then measured and constitutes the altitude index.

One purpose of this invention is to provide apparatus radiating a beam of energy for measuring the altitude of a vehicle above the earth or other surface reflecting the energy.

Another purpose is to provide apparatus to measure distance, employing a radiated beam of frequency-modulated energy by measuring the phase of one component of the modulation frequency in the heterodyne product of the transmitted and received echo energy.

Still another purpose is to provide apparatus to measure distance employing a radiated beam of doubly frequency-modulated energy, by measuring the phase of the double-modulation difference frequency in the product of the transmitted and received echo energy.

Further understanding of this invention may be secured from the detailed description and associated drawings, in which.

Figure 1:
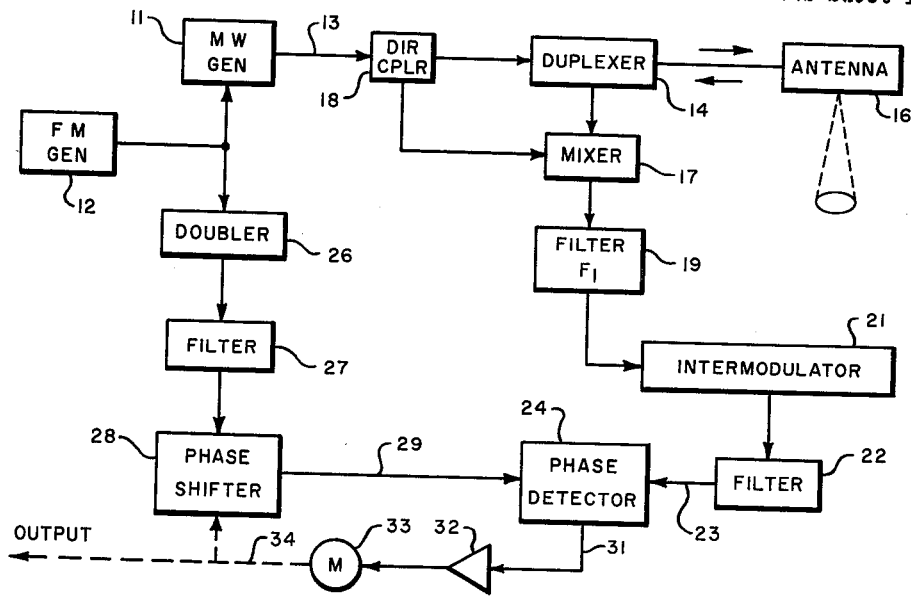
FIGURE 1 is a circuit diagram of one embodiment of the invention.

Referring now to FIGURE 1, an airborne altimeter includes a microwave generator 11 which generates a sinusoidal wave carrier signal.

The generator 11 is sinusoidally frequency modulated by a frequency modulation generator 12 having a frequency $p$. The output of generator 12 may have any periodic waveform whatever, but it is most economical of power to employ a sinusoidal waveform. The frequency-modulated carrier is emitted on conductor 13. As an example, the carrier frequency is 13.5 kmc. p.s. and the modulating frequency is 500 kc. p.s., with a modulation index of 0.9. The frequency-modulated carrier is applied through a duplexer 14 to an antenna 16. This antenna radiates a single, narrow, conical beam vertically downward to the earth. The antenna may either be carried by a platform which is horizontally stabilized, or may be fixed to the aircraft. Although in the latter case the antenna beam is deflected from the vertical direction by aircraft pitch and roll, the errors introduced into the output of this altimeter are not serious in any but the most critical applications.

Microwave energy echoed from the earth is received by the antenna 16, converted into corresponding microwave currents, and transmitted through the duplexer 14 to a mixer 17. A small amount of generator 11 frequency-modulated carrier signal energy either leaks into the mixer 17 because of imperfect duplexer isolation or is applied to the mixer from a directional coupler 18 which diverts a very small part of the generator energy from conductor 13 to the mixer. The mixer intermodulates the transmitted and received signal energies and applies the product to a filter 19. This is a band-pass filter centered at a frequency, $F_1$, equal to the modulation frequency, $p$, of the modulating generator 12. The band width is great enough to pass all associated spectra including Doppler spectra immediately above and below $F_1$. At this point "carrier" of single frequency $F_1$ may not exist at all in the presence of Doppler shifts, noise and other aberrations always present in the received echo signal. The output terminals of filter 19 are connected to an intermodulator 21, which may, for example, consist of a full-wave rectifier. The intermodulator is followed by a filter 22 sharply tuned to a frequency $F_2$ which is equal to twice the modulation frequency, $p$, and which is so narrow band that it excludes noise and Doppler sidebands transmitted and doubled by the intermodulator 21. These doubling and filtering operations generate and isolate a single, pure frequency, $2p$. This single frequency signal is substantially the only output at conductor 23 of filter 22. It is applied to a phase detector 24.

The single-frequency output of frequency $p$ of the modulation generator 12 is applied to a frequency doubler 26 and the single-frequency output of frequency $2p$ is filtered through a narrow band-pass filter 27. The filtered output signal is transmitted through a phase shifter 28 to phase detector 24, where the signal serves as a phase reference.

The phase detector 24 emits a signal representing, by its amplitude, the difference angle, $\theta$, between the phase of signal in conductor 23 and the phase of the reference signal in conductor 29. The emitted signal in conductor 31 also represents, by its polarity, the sense of the phase difference. The output is amplified in amplifier 32 and applied to a motor 33 having its shaft 34 connected to operate the phase shifter 28.

In the operation of this circuit the frequency-modulated output potential, $e$, of the microwave generator 11 in conductor 13 is described by $$e = E \sin(wt + m \sin pt) \quad (2)$$

in which:

$E$ = peak potential,
$w$ = carrier frequency in radians per second,
$t$ = time,
$m$ = modulation index,
$p$ = modulation frequency in radians per second.

Figure 2:
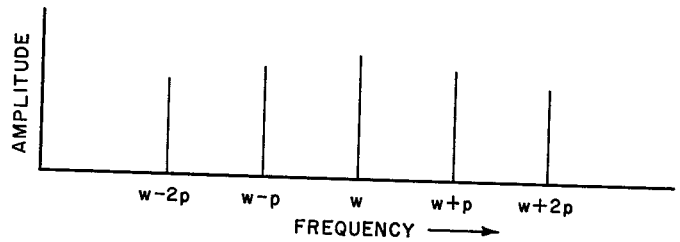
FIGURES 2, 3 and 4 are amplitude-frequency diagrams illustrating operation of the embodiment of FIGURE 1.
Figure 3:
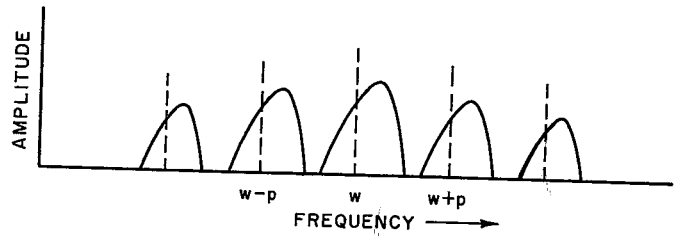

The potential $e$ contains a number of single frequencies as shown in FIGURE 2. This spectrum of frequencies is radiated from the antenna 16. The echo signal received by the antenna is affected by the motion of the aircraft, which usually produces, because of the Doppler effect, shifts in all of the frequencies of FIGURE 2. Because of the finite width of the microwave beam and other causes, the received frequencies are not pure, but each is broadened into a spectrum of frequencies. There is also a time delay T, of the echo signal proportional to the round-trip distance between the aircraft and the earth. This time delay results in phase shifts in both the carrier and the modulating component of the signal. These causes may result in any of a variety of spectrum forms, depending on the conditions of aircraft operation, one variety of form being indicated in FIGURE 3. The centers of the spectra are shifted upward from the carrier and sideband frequencies, and the spectra become asymmetric. This group of spectra is applied to the mixer 17, FIGURE 1, which multiplies this composite signal by the transmitter's composite signal shown in FIGURE 2. After modulation in mixer 17, the resulting signal has a frequency spectrum which is equivalent to folding the spectrum of FIGURE 3 about the carrier frequency, $w$, reducing the carrier frequency to zero, as shown in FIGURE 4.

Figure 4:
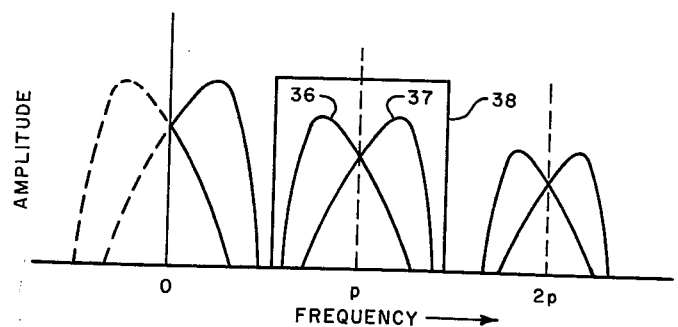

The output of mixer 17 having the spectrum of FIGURE 4, in which the several noise and Doppler spectra are exaggerated for clarity, is now passed through the band-pass filter 19 having a central transmission frequency of $F_1$, equal to $p$, and having a bandwidth capable of passing both of the Doppler and noise sidebands 36 and 37, FIGURE 4. The width of this filter band is indicated by the form 38. The output of this filter consists only of the noise-like spectra 36 and 37. There is no central spike at all at the frequency $p$. This signal is therefore not suitable for phase measurements because it contains a number of frequencies. It may be represented by:

$$e_1 = K\left\{ \sin\left[p\left(t - \frac{T}{2}\right) + f(t)\right] + \sin\left[p\left(t - \frac{T}{2}\right) - f(t)\right] \right\} \quad (3)$$

in which $e_1$ is the potential function at the output of filter 19, K includes amplitude and modulation index terms, and T is the radio beam travel time, or time delay, as before stated. $f(t)$ represents the Doppler function, such as represented by the form 37. This equation contains no term at the frequency $p$, but contains only two terms describing the frequencies of the spectra 36 and 37, FIGURE 4.

The signal is now passed through the intermodulator 21, resulting in a term having a double frequency resulting from the multiplication of the spectral frequencies 36 and 37. These two spectra have a very special relation to each other. Because of the way in which they are generated, one is the mirror image of the other. In the time domain, when one spectrum assumes a frequency separated from the frequency $p$ by a certain amount, the other spectrum simultaneously has a frequency separated from the frequency $p$ by the same amount but in the opposite direction. As a result, when these spectra signals are multiplied together, they generate a sharp line spectrum at the frequency $2p$, in addition to other crossproduct frequencies. The signal of interest at the output of the intermodulator has the form of the proportionality:

$$e_2 \alpha \cos 2p\left(t - \frac{T}{2}\right) \qquad (4)$$

which may be derived from equation 3 by appropriate mathematical manipulation. In this proportionality, which does not contain the Doppler term, $e_2$ is the line spectrum part of the signal emitted from the intermodulator 21. It is segregated by the sharp filter 22, having maximum transmission at the frequency $2p$, and is applied to the phase detector 24. It will be noted that the signal $e_2$ contains altitude information in explicit form, in the quantity T. Furthermore, the information is uncontaminated by Doppler shifts.

The phase of the frequency modulation generator 12 is employed as reference in measuring the phase at conductor 23. However, in phase measurements the reference should be at the same frequency as the signal being measured. The output of generator 12 is therefore doubled in frequency by doubler 26 and thereafter filtered to remove the fundamental frequency $p$, only the frequency $2p$ remaining.

The phase detector 24, amplifier 32, motor 33 and phase shifter 28 constitute a servomechanism. Its operation depends upon the relation $$\theta = \frac{4\pi p h}{c} \qquad (5)$$

in which, at loop balance, $\theta$ is the phase delay in radians corresponding to the travel time T, Equation 4, $h$ is aircraft altitude, and $c$ is the speed of light. In this servomechanism loop $\theta$ is also the shift of phase shifter 28, equal in amount and sense to the phase shift applied through conductor 23, and this angle $\theta$ is mechanically produced by the angular displacement, at loop balance, of the shaft 34. The displacement of this shaft thus constitutes the altimeter output quantity, and represents the altitude multiplied by a constant.

This embodiment has the limitation that at altitudes greater than an altitude equalling the speed of light divided by twice the modulation frequency, the angular output, $\theta$, is ambiguous. This limitation is overcome in the embodiment of FIGURE 5.

Figure 5:
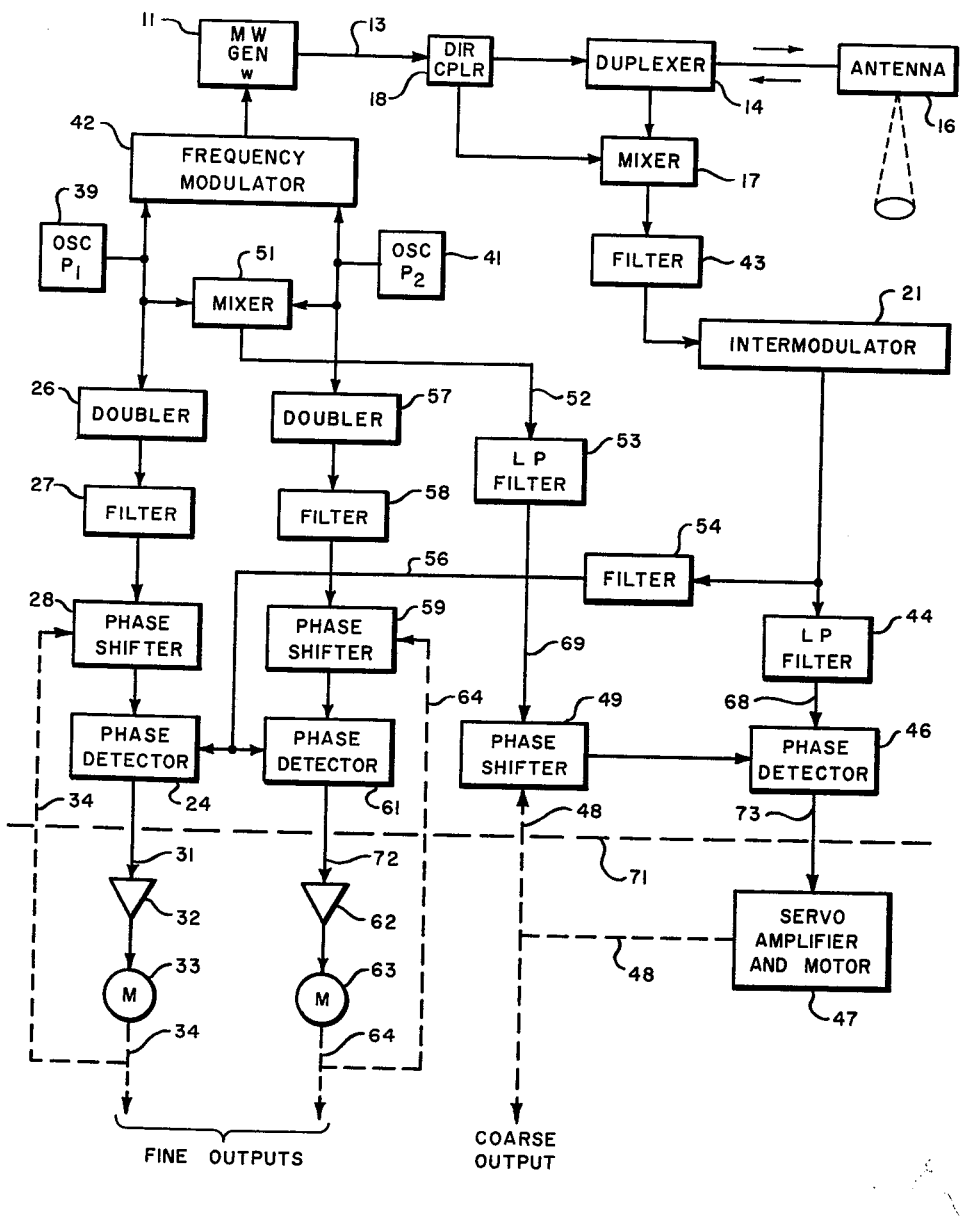
FIGURE 5 is a circuit diagram of another embodiment of the invention.

In FIGURE 5 a microwave continuous-wave generator 11 may, for example, have a carrier frequency of 13.5 km. c.p.s. It is simultaneously frequency modulated at two different modulating frequencies. The two modulating oscillators, 39 and 41 have sinusoidal output frequencies of $p_1$ and $p_2$ which may be, for example, 50 kc. p.s. and 55 kc. p.s. These outputs are mixed or added without intermodulation in a component 42, which applies the combined outputs to frequency modulate the generator 11, each modulation having an index of 0.9. The doubly frequency modulated output of generator 11 in conductor 13 is passed through a directional coupler 18 and duplexer 14 to an antenna 16 which radiates a single beam directly downward from the aircraft to the earth or other reflecting surface below.

The signal derived from the echo of this beam is directed to a mixer 17, where it is demodulated by heterodyning with a small part of the transmitter signal secured from the directional coupler 18. The output is filtered in band-pass filter 43 and applied to the intermodulator 21. The output is passed through a low-pass filter 44 to a phase detector 46, the error output signal of which is applied to an amplifier and motor 47. The motor shaft 48 is connected to a phase shifter 49, the output of which serves as phase reference to the phase detector 46. The motor shaft 48 angular deflection constitutes the coarse output of the altimeter.

The outputs of oscillators 39 and 41 are again combined, this time by multiplication in a mixer 51, to form the intermodulation products in conductor 52. These products are transmitted to a low-pass filter 53, the output of which is applied to the phase shifter 49.

The output of oscillator 39 is doubled in frequency in a doubler 26, the output of which is passed through a filter 27 to remove the fundamental frequency, and through phase shifter 28 to serve as the phase reference applied to a phase detector 24. The signal phase to be measured is that of one of the double-frequency outputs of intermodulator 21. This output is filtered in a band pass filter 54 to remove the fundamental spectrum and is transmitted through conductor 56 to the phase detector 24. The error signal output of phase detector 24 is applied through conductor 31 to a servo amplifier 32 and servo motor 33, the shaft 34 of which controls phase shifter 28 and also constitutes one of the system's fine outputs.

The output of oscillator 41 is doubled in frequency in a doubler 57, the output of which is passed through a filter 58 to remove the fundamental frequency and through phase shifter 59 to serve as the phase reference applied to a phase detector 61. The double-frequency signal phase to be detected and measured is applied to phase detector 61 through conductor 56. The error signal output of phase detector 61 is amplified in a servo amplifier 62 and applied to drive a servo motor 63. The motor shaft 64 controls the phase shifter 59 and constitutes another system fine output having substantially the same output data function as shaft 34.

In this circuit the components 11 to 34, inclusive, together with oscillator 39 and filters 43 and 54, have the same functions as the like-numbered components of FIGURE 1 including generator 12 and filters 19 and 22. The angular deflection of shaft 34, FIGURE 5, is proportional to aircraft altitude and may be used to indicate altitude directly, but suffers the same altitude limitation on its unambiguous reading range as described for the FIGURE 1 circuit. Similarly, the components 11 to 21 inclusive, FIGURE 5, together with components 41, 43 and 54 to 64 inclusive, have the same functions as those of components 11-34 and 39. The output, which is the angular deflection of shaft 64, is proportional to aircraft altitude and is substantially to the same scale as the output of shaft 34.

Both of the outputs, at shafts 34 and 64, are to fine scales, indicating altitude with errors of only a foot or so, but indicate unambiguously to only low altitude limits. These outputs are termed the fine-grained, fine, or vernier outputs. These outputs are substantially alike and it is quite unnecessary to utilize both of them unless such redundancy is for reasons of signal strength or reliability particularly desired. That is, it is desirable to provide the components from doubler 26 to motor 33, or else to provide the components from doubler 57 to motor 63, but it is superfluous to provide both lines of components, and in practice only one need be provided. Both are shown and described only to teach that either form of fine output generation is equally possible.

Figure 6A:
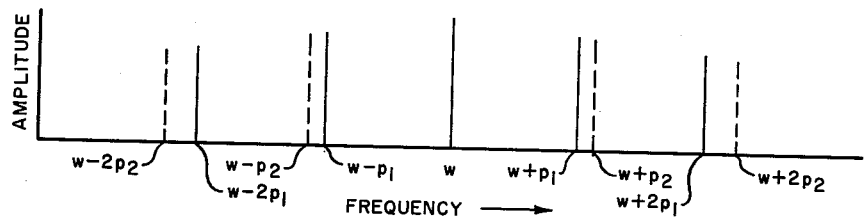
FIGURES 6A, 6B, 7A and 7B are amplitude-frequency diagrams illustrating operation of the embodiment of FIGURE 5.
Figure 6B:
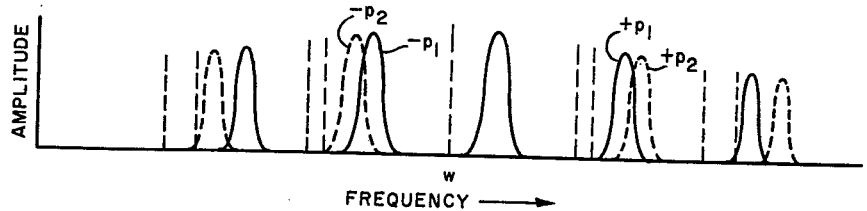
Figure 7A:
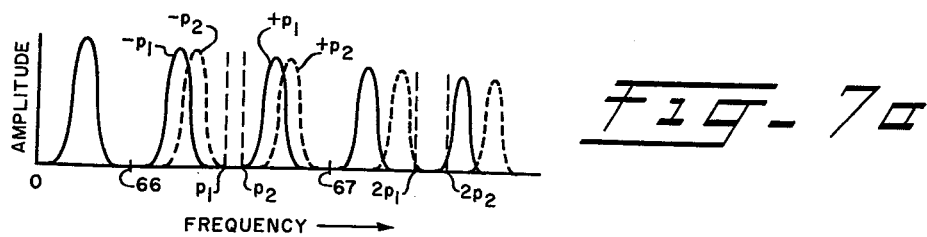
Figure 7B:
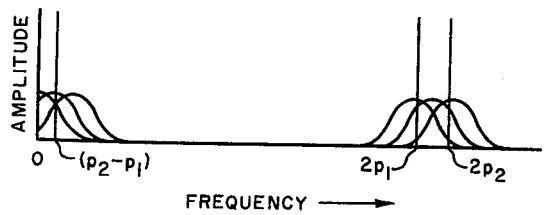

In the operation of the embodiment of FIGURE 5, the microwave generator 11 generates an output of frequency $w$ which is doubly frequency modulated at frequencies $p_1$ and $p_2$ by oscillators 39 and 41. The frequency modulated output in conductor 13 therefore contains the carrier frequency together with two sets of frequency modulation sidebands as described by $$e = E \sin(wt + m \sin p_1 t + n \sin p_2 t) \qquad (6)$$

in which $m$ and $n$ are modulation indexes. The frequencies of the transmitted outputs are illustrated in FIGURE 6A, which consists of two superimposed diagrams of the form of FIGURE 2, one set being shown by solid lines and the other by dashed lines to distinguish it from the first set. An example of a received signal derived from the echo energy, in which the lines of FIGURE 6A are broadened to spectra, and which contains Doppler shifts, is shown in FIGURE 6B. The first order upper and lower sidebands are marked by the reference characters $+p_1$, $p_2$, $-p_1$, and $-p_2$. This received signal is applied to the mixer 17, FIGURE 5, where it is heterodyned to zero-frequency carrier, with the result shown in FIGURE 7A. The first order upper and lower sidebands are folded upon themselves, and bear the same reference letters as in FIGURE 6B. These four spectra are present in a frequency band extending from 66 to 67, FIGURE 7A, but there are no first-order carriers at $p_1$ and $p_2$, as can be shown by algebraic manipulation of Equation 6. A band pass filter 43, FIGURE 5, is connected to the output of mixer 17. This filter transmits only the band of frequencies between 66 and 67, FIGURE 7A, and this signal passed by the filter 43 is applied to the intermodulator 21. Since the sidebands are highly coherent in pairs, in the mirror image sense, just as in FIGURE 4, intermultiplication of the several spectra between 66 and 67 generates, by doubling, two sharp synthetic carrier spikes at $2p_1$ and $2p_2$, and also generates a single sharp synthetic carrier spike at the difference frequency, $p_2-p_1$. This latter carrier spike is utilized in this embodiment to produce the coarse output, high altitude output signal. The pair of carrier spikes at $2p_1$ and $2p_2$, being similar in all respects to the synthetic carrier at frequency $2p$ generated by the circuit of FIGURE 1, are similarly used to produce a pair of fine outputs limited to a low altitude unambiguous range. Intermodulation of the range 66 to 67, FIGURE 7A, also produces other, lower-amplitude, wide-spectrum modulation products. The three carriers and some of the other products are indicated in FIGURE 7B.

The output of intermodulator 21, FIGURE 5, is passed through the filter 44 which is designed to pass the frequency $(p_2-p_1)$. In this case this frequency is 5 kc. p.s. It is satisfactory to employ a low-pass filter although instead, a sharply-tuned band-pass filter could be used. The output is applied as one input of the phase detector 46.

The outputs of oscillators 39 and 41 are multiplied in mixer 51 and the intermodulated output, including that of frequency $(p_2-p_1)$, is isolated from the fundamental frequencies by low pass filter 53 and applied to the phase shifter 49. The phase-shifted output is applied as the phase-reference input of the phase detector 46. The output of phase detector 46 consists of a direct-current error signal representing by its amplitude the difference in phases of the two inputs. This error signal is applied to the servo amplifier and motor 47, which shifts the reference phase by means of phase shifter 49 in such direction and amount as to bring the error signal to zero. The angular deflection of shaft 48 is then a measure of the difference in phases of the two inputs in conductors 68 and 69.

It may be shown by algebraic manipulation of the function representing the signal in conductor 68 that this phase difference, $\theta$, represents altitude in accordance with Equation 5 and that the maximum altitude, $h$, to which unambiguous indication can be secured is in accordance with Equation 1 in which $p_2-p_1$ is substituted for $p$. As a numerical example, when as in this case $p_2-p_1$ equals 5 kc. p.s., the maximum altitude is 18.6 miles.

The output of the intermodulator 21 is also passed through the filter 54, which has a transmission band only wide enough to transmit both of the carriers $2p_1$ and $2p_2$, FIG. 7B. The filter output is applied to the phase detectors 24 and 61.

These detectors secure their reference phases from oscillators 39 and 41 as follows. The output of oscillator 39 is doubled in doubler 26, filtered in filter 27, and passed through phase shifter 28 to the phase detector 24, this phase reference signal therefore containing the single frequency $2p_1$. Similarly, the output of oscillator 41 is doubled in doubler 57, filtered in filter 58 and passed through phase shifter 59 to the phase detector 24, the signal containing the single frequency $2p_2$.

The phase detector 24 emits an error signal which, through amplifier 32 and motor 33, adjusts phase shifter 28 to bring the error signal to zero, when the angular deflection of shaft 34 represents altitude.

The phase detector 61 emits an error signal which, through amplifier 62 and motor 63, adjusts phase shifter 59 to bring the error to zero, when the deflection of shaft 64 represents altitude.

The indication of shaft 34 is unambiguous only below 9840 feet altitude, and that of shaft 64 is unambiguous only below 8920 feet altitude. However, the probable indication errors of the shafts 34 and 64 are some 10% of the error of shaft 48, so that, even in their ambiguous altitude ranges, the shafts 34 or 64 are useful as vernier-indication accessories to shaft 48. Either one may be so used.

The fine and coarse indicating elements may be connected together to produce a single indication having the altitude capability of the coarse output shaft 48 and the accuracy of either of the fine output shafts 34 and 64.

Figure 8:
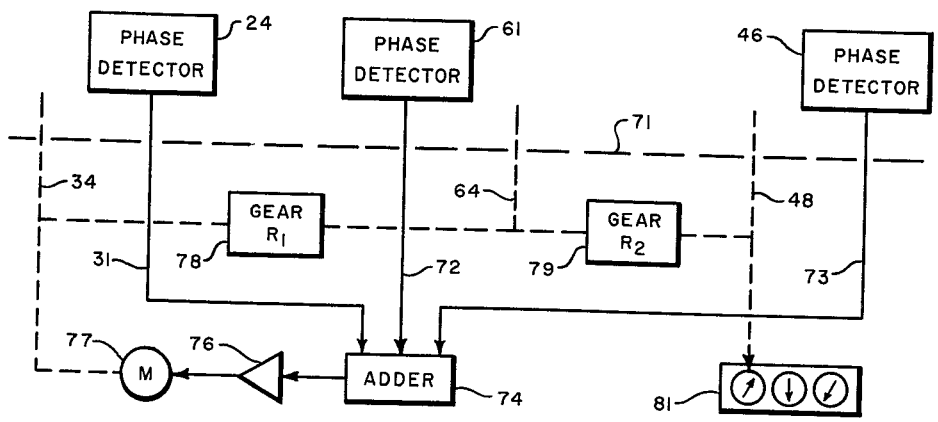
FIGURE 8 is a circuit diagram of a modification of that portion of the circuit of FIGURE 5 located below the line 71, and illustrates one manner of combining the three outputs into a single output.

One way in which this can be done is shown in FIG. 8, in which all three outputs are connected electrically, thus providing redundant fine indication. FIG. 8 is to be employed in conjunction with FIG. 5, all of the components of FIG. 8 below the dashed lines 71 being substituted for the components of FIG. 5 below the dot and dash line 71. The error output signals from phase detectors 24, 61 and 46 in conductors 31, 72 and 73 are applied to an adding circuit 74 which produces a composite error signal. This signal is applied to an amplifier 76. The amplified composite error signal is applied to a motor 77. The motor shaft is connected to any one of the phase shifter shafts, in this case shaft 34. The phase shifter shafts 34 and 64 are joined together by a gear set 78 having a gear speed ratio equal to the ratio of the frequencies of the oscillators associated with the shafts. In this case the ratio $r_1$ of the speed of the gear connected to shaft 34 to that of the gear connected to shaft 64 is $r_1=p_1/p_2$. Similarly a gear set 79 having ratio $r_2=p_2/p_2-p_1$ joins the shafts 64 and 48. Output is taken from the slowest shaft 48 to an indicator 81 having three dials internally geared together to indicate feet, tens of feet and hundreds of feet.

In operation, all three error signals applied to the adder 74 come to their nulls together at any altitidute. However, the width of null of the coarse signal in conductor 73 being ten times as great as the null width of the fine signals in conductors 31 and 72, the latter assume control near the null to provide ten times the accuracy possible with the coarse signal alone. The shafts 34 and 64 rotate approximately ten times while shaft 48 rotates once, so that within the coarse output altitude range there is no ambiguity when the composite output is taken from the coarse output shaft 48.

What is claimed is:

1. A device of the kind described comprising, means for generating a continuous wave signal, an oscillator generating a selected frequency signal connected to frequency modulate said continuous wave signal at said selected frequency, means transmitting said frequency modulated signal toward a reflecting surface and for receiving echo signals thereof, means deriving a pair of first order frequency sideband spectra from said echo signals and for suppressing the carrier frequency thereof, means intermodulating said sideband spectra and producing therefrom a signal whose frequency is twice that of said selected frequency signal, means for doubling the frequency of the output of said oscillator to produce a double frequency signal, means for comparing the phase of said double frequency signal and the phase of the signal produced by said intermodulating means, and indicating means operated by said phase comparison means.

2. A device of the kind described comprising, means for generating a continuous wave electrical signal, an oscillator generating a selected frequency electrical signal connected to frequency modulate said continuous wave signal at said selected freqency, an antenna energized by said continuous wave electrical signal transmitting radiation toward a reflecting surface and receiving echoed radiation therefrom, means deriving a pair of first order frequency sideband spectra from said echoed radiation, filter means for transmitting a band of frequencies including said pair of first order spectra, means intermodulating said first order sideband frequency spectra to form a narrow band product having a frequency equal to the sum of the frequencies of said pair of first order spectra, means for doubling the frequency of the output of said oscillator to produce a double frequency signal, means for comparing the phase of said double frequency signal and the phase of the signal produced by said intermodulating means, and indicating means operated by said phase comparison means.

3. A microwave radio system for measuring the distance between a vehicle and a distant target comprising, a generator of a continuous microwave signal, an oscillator frequency-modulating said continuous microwave signal at a selected modulating frequency to produce a frequency-modulated transmitter signal, an antenna-transmitter-receiver radiating said transmitter signal toward said target, receiving echoes therefrom and producing an electrical microwave signal representative of said echoes, means heterodyning said electrical microwave signal with the modulated transmitter signal to produce a signal having zero carrier frequency, said zero carrier frequency signal including frequency spectra associated with the first order frequency sideband, filter means segregating said frequency spectra associated with the first order sideband, an intermodulator receiving said filter output and emitting modulation products including a sharp single-frequency signal having a frequency equal to twice the selected modulating frequency of said oscillator, filter means filtering said sharp single-frequency signal, a frequency doubler connected to said oscillator emitting a reference signal having a frequency double that of said oscillator and have a phase representative of the phase of said oscillator, and phase-comparison means measuring the difference in phase of said sharp single-frequency signal and said reference signal to form a system output signal representing said distance between the vehicle and the target.

4. A microwave radio system in accordance with claim 3 in which said phase-comparison means includes a motor, a phase shifter actuated by said motor and receiving said reference signal to emit a phase-shifted reference signal, a phase detector receiving said phase-shifted reference signal and said single-frequency signal, said phase detector emitting an error signal representing by its amplitude and sense the phase difference and sense of difference between the two inputs, an amplifier amplifying said error signal, and means applying said amplified error signal to said motor whereby feedback loop action tends to reduce said error signal to zero and the accompanying shift of said phase shifter as measured by the angular deflection of said motor shaft represents the distance between said vehicle and said distant target.

5. A radio altimeter carried by an aircraft for measuring the distance to a target comprising, a microwave continuous wave generator on said aircraft, a modulation oscillator frequency modulating said generator at a modulation frequency to form a frequency-modulated continuous signal, an antenna radiating said frequency-modulated continuous signal to said target and receiving an echo therefrom, means deriving an electrical echo signal from said echo, a demodulator receiving said echo signal and a heterodyning signal and generating a difference signal having a zeroeth order zero carrier frequency beat signal and first order frequency-difference sidebands at an average frequency equal to said modulation frequency, a band-pass filter transmitting said first order frequency-difference sidebands, an intermodulator receiving the output of said filter to form a single-frequency signal having twice said modulation frequency, a second band-pass filter transmitting said single-frequency signal, a frequency doubler excited by said modulation oscillator to produce a reference signal having twice said modulation frequency, means filtering said reference signal, a phase shifter, a motor shifting said phase shifter, a connection from said filtering means applying said filtered reference signal to said phase shifter, a phase detector connected to said phase shifter and receiving from said second band-pass filter the single-frequency signal and emitting an error signal representing the phase difference of said single-frequency signal and said phase-shifted reference signal, and means amplifying said error signal and applying it to said motor whereby the angular deflection of said motor shaft representing the phase difference of said single frequency signal and said reference signal unambiguously indicates the distance to said target when twice said distance is less than the speed of light divided by said modulation frequency.

6. A device of the kind described comprising, generator means generating a continuous-wave transmitting signal, a pair of oscillators having slightly separated selected modulating frequencies, said pair of oscillators being connected to frequency modulate said generator means at each of said modulating frequencies to form a twice modulated transmitter signal, means actuated by said transmitter signal beaming radiation representative thereof to a distant target receiving echoes therefrom and emitting an electrical received signal representative thereof, means demodulating said electrical received signal to a zero carrier frequency signal having sidebands including frequency spectra associated with the first order frequency sidebands, an intermodulator deriving from said demodulated signal a signal having two sharp single frequencies equal to twice said slightly separated selected modulating frequencies, means connected to said pair of oscillators for doubling said slightly separated modulating frequencies to produce two comparison signals, means measuring the phase difference between at least one of said two comparison signals and the sharp single-frequency signal having the same frequency to form at least one system output signal representing to a fine scale the distance between said beaming means and said distant target, a low pass filter connected to said intermodulator emitting a sharp single-frequency low-frequency signal having the frequency of the difference of said first order frequency sideband center frequencies, means connected to said pair of oscillators for multiplying the outputs thereof and isolating therefrom a reference signal having a frequency equal to the difference of said slightly separated selected modulating frequencies, and means measuring the phase difference between said reference signal and said sharp single-frequency low-frequency signal to form another system output signal representing to a coarse scale the distance between said beaming means and said distant target.

7. A device in accordance with claim 6 in which said intermodulator includes a band-pass filter segregating frequency spectra associated with all four first order frequency-modulated sidebands generated by the double frequency modulation, means intermodulating the output thereof to form a pair of sharp single-frequency signals at frequencies twice said selected frequencies and a third sharp single-frequency low-frequency signal at a frequency of the difference of said selected frequencies.

8. A device in accordance with claim 6 in which said means measuring the phase difference between at least one of said comparison signals and the sharp single-frequency signal having the same frequency includes a phase shifter receiving a said comparison signal, a motor controlling said phase shifter, and a phase detector receiving the signal of said phase shifter and receiving one of said signals having sharp single frequencies, said phase detector error outputs respectively actuating said motor, and in which said means measuring the phase difference between said reference signal and said sharp single-frequency low-frequency signal includes a phase shifter receiving the difference frequency output of said means connected to said pair of oscillators, a phase detector receiving said phase-shifted output of the phase shifter and said low-pass filter output and emitting an error signal, and a motor actuated by said error signal and controlling said phase shifter.

9. A device of the kind described comprising, means for generating a continuous wave signal, an oscillator generating a selected frequency signal connected to frequency modulate said continuous wave signal at said selected frequency, means transmitting said frequency-modulated signal toward a reflecting surface and for receiving echo signals thereof, means operated by said echo signals and said frequency modulated signal for producing a modulation difference output containing frequency modulation sideband pairs of different orders and for suppressing the carrier frequency of each pair, a filter having said modulation difference output imposed thereon and transmitting only one of said pairs of sidebands of a selected order having an average frequency which is an integral multiple of said selected frequency, said integral multiple representing the order of the selected sideband, means intermodulating the pair of sidebands transmitted by said filter and producing therefrom a signal having a frequency which is double the integral multiple of said selected frequency, means for multiplying the frequency of the output of said oscillator by a factor which is double said integral multiple to produce a phase reference signal, means for comparing the phase of said phase reference signal and the phase of the signal produced by said intermodulating means, and indicating means operated by said phase comparison means.

10. A microwave radio system for measuring the distance between a vehicle and a distant target comprising, a generator of a continuous microwave signal, an oscillator frequency-modulating said continuous microwave signal at a selected modulating frequency to produce a frequency modulated transmitter signal, an antenna-transmitter-receiver radiating said transmitter signal toward said target, receiving echoes therefrom and producing an electrical microwave signal representative of said echoes, means heterodyning said electrical microwave signal with the modulated transmitter signal to produce a signal having zero carrier frequency, said zero carrier frequency signal including frequency spectra associated with different order sidebands, filter means segregating the frequency spectra associated with a selected order sideband, an intermodulator receiving said filter output and emitting modulation products including a sharp single-frequency signal having a frequency equal to twice the number of the order of the selected order sideband multiplied by said selected modulating frequency, second filter means filtering said sharp single-frequency signal, a frequency multiplier connected to said oscillator emitting a reference signal equal to the frequency of the output emitted by said second filter means and having a phase representative of the phase of said oscillator, and phase comparison means measuring the difference in phase of said sharp single-frequency signal and said reference signal to form a system output signal representing said distance between the vehicle and target.

References Cited in the file of this patent

UNITED STATES PATENTS

| | | |
|---|---|---|
| 3,054,104 | Wright et al. | Sept. 11, 1962 |
| 3,068,471 | Erst | Dec. 11, 1962 |